(12) United States Patent
Fischer

(10) Patent No.: US 12,198,020 B2
(45) Date of Patent: Jan. 14, 2025

(54) EFFICIENT TEMPORAL MEMORY FOR SPARSE BINARY SEQUENCES

(71) Applicant: Robert Bosch GmbH, Stuttgart (DE)

(72) Inventor: Volker Fischer, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1087 days.

(21) Appl. No.: 17/103,833

(22) Filed: Nov. 24, 2020

(65) Prior Publication Data
US 2021/0182735 A1    Jun. 17, 2021

(30) Foreign Application Priority Data

Dec. 11, 2019    (EP) .................................... 19215261

(51) Int. Cl.
*G06N 20/00*    (2019.01)
*G06N 5/04*    (2023.01)

(52) U.S. Cl.
CPC .............. *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| | | |
|---|---|---|
| 2011/0060708 A1 | 3/2011 | Suzuki |
| 2013/0254138 A1* | 9/2013 | Kudritskiy ............... G06N 3/04 706/26 |
| 2020/0193297 A1* | 6/2020 | Verhoef .................. G06N 3/084 |

OTHER PUBLICATIONS

Rae, Jack, et al. "Fast parametric learning with activation memorization." International Conference on Machine Learning. PMLR, 2018. (Year: 2018).*
Nazari, Najmeh, et al. "Multi-level binarized lstm in eeg classification for wearable devices." 2020 28th Euromicro International Conference on Parallel, Distributed and Network-Based Processing (PDP). IEEE, 2020. (Year: 2020).*
Wang, Cheng. "Rra: Recurrent residual attention for sequence learning." arXiv preprint arXiv:1709.03714 (2017). (Year: 2017).*
Tanaka, Gouhei, et al. "Spatially arranged sparse recurrent neural networks for energy efficient associative memory." IEEE transactions on neural networks and learning systems 31.1 (2019): 24-38. (Year: 2019).*

(Continued)

*Primary Examiner* — Andrew T Chiusano
(74) *Attorney, Agent, or Firm* — NORTON ROSE FULBRIGHT US LLP; Gerard A. Messina

(57) ABSTRACT

Systems and computer-implemented methods for training a machine learnable model and for using the machine learned model for inference, both of which using only limited memory resources. During training and inference, the machine learnable model uses previous state information. A state memory is provided which efficiently stores this previous state information. Instead of storing each previous state individually and integrally, for each element of the internal state, a value is stored in the state memory which is indicative of a most recent occurrence of an element of the internal state of the machine learnable model holding or transitioning to a particular binary state value. The states of the machine learnable model are representable as binary values and when states infrequently hold or transition to a particular binary state value.

17 Claims, 8 Drawing Sheets

(56) References Cited

OTHER PUBLICATIONS

Andri, Renzo, et al. "YodaNN: An ultra-low power convolutional neural network accelerator based on binary weights." 2016 IEEE Computer Society Annual Symposium on VLSI (ISVLSI). IEEE, 2016. (Year: 2016).*

Qin, Haotong, et al. "Binary neural networks: A survey." Pattern Recognition 105 (2020): 107281. (Year: 2020).*

Hammer, Patrick::"Adaptive Neuro-Symbolic Network Agent", Jul. 25, 2019, ROBOCUP 2008: Robot Soccer World Cup XII; [Lecture Notes in Computer Science], Springer International Publishing, AGI 2019, LNAI 11654, pp. 80-90, XP047515490.

Qin, et al.: "Recurrent Attentive Neural Process for Sequential Data", Arxiv.org, Cornell University Library, (2019), XP081518422, pp. 1-12.

Ahmad, Subutai et al. "How do neurons operate on sparse distributed representations? A mathematical theory of sparsity, neurons and active dendrites", arXiv preprint arXiv:1601.00720 (2016). Retrieved from the Internet on Nov. 24, 2020: https://arxiv.org/abs/1601.00720. 23 Pages.

* cited by examiner

EFFICIENT TEMPORAL MEMORY FOR SPARSE BINARY SEQUENCES

CROSS REFERENCE

The present application claims the benefit under 35 U.S.C. § 119 of European Patent Application No. EP 19215261.9 filed on Dec. 11, 2019, which is expressly incorporated herein by reference in its entirety.

FIELD

The present invention relates to a system and computer-implemented method for training a machine learnable model using limited memory resources. The present invention further relates to a system and computer-implemented method for using a machine learned model for inference using limited memory resources, for example to control or monitor a physical system based on a state of the physical system which is inferred from sensor data. The present invention further relates to a computer-readable medium comprising data representing instructions for a processor system to perform either computer-implemented method.

BACKGROUND INFORMATION

Machine learned ('trained') models are widely used in many real-life applications, such as autonomous driving, robotics, manufacturing, building control, etc. For example, machine learnable models may be trained to infer a state of a physical system, such as an autonomous vehicle or a robot, etc., or the system's environment, e.g., the road on which the vehicle is travelling, the robot's workspace, etc., based on sensor data which is acquired by one or more sensors. Having inferred the state, the physical system may be controlled, e.g., using one or more actuators, or its operation may be monitored.

Often, the machine learnable model (and after training, the machine learned model, both of which may also be referred to as 'machine learnable model') has an internal state x(t) which may have been computed based on sensor data. For example, in case the machine learnable model is a (deep) neural network, the state $x(t)=(x_1, \ldots, x_N(t))$ ($x_{i(t)} \in \{0,1\}$, N>>) may include all activation/states of all layers of the neural network.

In many real-life applications, machine learnable models process temporal data, e.g., by processing time-sequential sensor data, to make use of information from previous time steps for current decision making. Examples of such real-life applications include, but are not limited to, pattern recognition (e.g., speech recognition, handwriting recognition), machine translation, control of complex physical systems, etc.

So-called recurrent machine learnable models, such as recurrent neural networks, are often well-suited for such tasks. In such and similar types of models, the computation of x at time t also depends on the state x at previous time steps (e.g., t−1). Hence, for the computation of x(t), one or more previous states $x(t-1), x(t-2), \ldots, x(t-T)$ have to be memorized for this computation, e.g., by storing $X(t)=(x(t), x(t-1), x(t-2), \ldots, x(t-T))$ in memory, where X(t) denotes the memorized previous states at time t.

Because x is normally very large (e.g., millions of activations for a deep neural network), storing this temporal window is very memory expensive. This not only holds for the training, but also for the subsequent use of the machine learned model for inference. This may severely limit the applicability of such machine learned models. Namely, in various application areas, there may be insufficient memory available, for example due to engineering or cost restrictions. As an alternative, fewer previous states may be stored, but this may result in a decrease in performance of the machine learned model, which may lead to poorer performance in speech recognition, autonomous driving, robot control, etc. Moreover, in applications where it is needed to account for a time delay d, for example the time delay between a current action u(t) performed by an autonomous system affecting a sensor measurement s(t) of the system, it may also not be feasible to store fewer previous states than the number of states which correspond with the time delay to be captured.

Conventionally, binary (sparse) representations ([1]) are used to encode information. For example, the activation $x_i(t)$ of a single unit (e.g., neuron) of the machine learnable model, which may represent a state element of said model, may be encoded as only the values 'O' or '1'. Such binary representations may suffice in many application areas, for example when using event-based sensors in which events are detected ('1') or not ('0'), or when the encoding as a binary representation is otherwise considered sufficiently accurate.

While binary representations are by themselves more memory efficient than having to store, for example, state values as floating-point values, the problem still remains that storing a temporal window of previous states remains very memory expensive.

REFERENCES

[1] "How do neurons operate on sparse distributed representations? A mathematical theory of sparsity, neurons and active dendrites," https://arxiv.org/abs/1601.00720

SUMMARY

It would be desirable to be able to train a machine learnable model, and to use a machine learned model for inference, using only limited memory resources.

In accordance with a first aspect of the present invention, a computer-implemented method and corresponding system are provided for training a machine learnable model, using only limited memory resources. In accordance with a further aspect of the present invention, a computer-implemented method and corresponding system are provided for using the machine learned model for inference, respectively. In accordance with a further aspect of the present invention, a computer-readable medium is provided comprising instructions for causing a processor system to perform a computer-implemented method.

The above measures involve training a machine learnable model and using the resulting machine learned model for inference, for example to control or monitor a physical system. The training may be performed using training data while the interference may be applied to non-training type of input data, such as sensor data obtained from a sensor associated with the physical system. The training data and the input data for interference each comprise a temporal sequence of input data instances. For example, the input data may comprise a temporal series of measurement values of a sensor, or different temporal series of measurement values of different sensors. The machine learnable model may have an internal state, as is conventional. For example, in case of a neural network, the internal state may be represented by activation values. In addition, the internal state of the machine learnable model may be dependent on one or more previous internal states of the machine learnable model, both during training and inference. For example, the machine learnable model may be a recurrent machine learnable model, such as a recurrent neural network. However, this is not a limitation, in that other types of machine learnable models exist in which the current internal state depends on one or more previous internal states.

The internal state of the machine learnable model may be directly comprised of, or representable as a set of binary values x(t) representing respective elements of the internal state. This is also conventional. To be able to train and subsequently use the machine learnable model, one or more previous internal states of the machine learnable model may have to be stored, for example in a system memory of the training system (e.g., a workstation or server) or in a system memory of the system, apparatus or device in which the machine learnable model is deployed (e.g., a processing unit of an autonomous vehicle, a health tracking watch, building control system, industrial robot control system, etc.).

Unlike previous approaches, in which each previous state is integrally stored, for example as a respective binary frame, and which in the following is also referred to as binary dense memory ('BDM') storage, a specific type of state memory is provided of which the configuration and operation is based on the following insights:

Temporally dense memories are expensive because they use large amounts of storage. If the binary state x has N dimensions $x(t)=(x_1(t), x_2(t), \ldots, x_N(t))$ (for deep neural networks N is very large, e.g. several millions), then a dense memory X over T time steps needs N*T bits of storage and is able to encode maximal delays of d=T.

For some applications, large potential time horizons T>> have to be covered. This may be the case for sparse/rare events in which $x_i(t)=1$ for few i but otherwise x(t)=0. For example, when the duration of one computation frame t→t+1 is very small (e.g., 1 ms), then the state is likely to be constant over more computation steps, and thus 0 if events are rare. This may also be the case when the necessary time horizon T (e.g. to cover a delay between an action and a sensor measurement reflecting the action) is a-priori unknown, and a conservatively large value for T has to be chosen.

To address the above, the state memory does not store each previous state individually and integrally, but rather comprises, for each element of the internal state, a value X(t) which is indicative of a most recent occurrence of the element holding or transitioning to a particular binary state value, with the most recent occurrence being expressed as a number of steps relative to the current training or inference step. Effectively, for each element of the internal state, which typically corresponds to a unit of the machine learnable model, e.g., a neuron, the state memory may store the duration until the last onset of holding or transitioning to a particular binary state value. In the following, the binary state value is assumed to be '1', e.g., representing an occurrence of an event, but may also be '0'.

For example, if the stored memory value of a unit is $X_i(t)=0$ at time frame t, this may mean that this unit was active at t: $x_i(t)=1$, while a memory value of $X_i(t)=4$ may mean that $x_i$ was activated four time frames ago: $x_i(t-4)=x_i(t-X_i(t))=1$.

During the training and inference, in each step of the training and inference, previous state information may be extracted from the state memory, so as to be able to determine a current internal state of the machine learnable model (which also further depends on the input data, e.g., the training data or input data for interference). Having determined the current internal state, the current internal state may then be 'stored' in the state memory again for use in a subsequent step. However, instead of integrally storing the current internal state, the state memory is updated with the current internal state, namely by, for each element of the internal state, updating the corresponding value of the state memory.

For example, if a particular unit is currently active, the memory value may be sets to $X_i(t)=0$. If, however, a particular unit is not active, and the memory value was previously set to $X_i(t)=4$ meaning that $x_i$ was activated four time frames ago, the memory value may then be incremented to $X_i(t)=5$. In other words, updating the state memory may comprise updating the state memory value for each element to the most recent occurrence of the element holding or transitioning to the particular binary state value.

This type of state memory, which is elsewhere also referred to as a binary last memory as it stores a 'last' occurrence, has been found to be highly suited for applications in which states are representable as binary values and in which events are relatively rare.

In contrast to a temporally dense memory X of b bits, which can store the accurate temporal state information for exactly b temporal frames (i.e., b previous internal states), storing only the duration information of the last occurrence can cover time horizons of $2^b-1$ temporal frames until the last onset. Accordingly, instead of using b bits to encode the last b=T frames, the b bits may be used to store a single (integer) duration until the last onset $x_i(t)=1$. In other words, given a certain memory size, the state memory may cover much larger time horizons than a temporally dense memory of the same size: while the used bits b directly yield the time horizon of the dense memory T=b, the state memory's maximally covered delay is $T=2^b-1$ which is exponentially larger than b.

While the state memory may be unable to reproduce repeated and frequent changes between previous states (e.g., an 'on'-"off" pattern), it has been found that the last occurrence of a unit of holding or transitioning to a certain value is often sufficient for certain applications and a temporally dense memory is not necessary and even insufficient in view of its time horizon being limited given the same memory footprint. An example of such an application is learning a delayed transformation, which is also described with reference to FIG. 4 elsewhere in this specification. In general, the state memory is particularly useful in applications where either binary sensor data is used, such as event-based sensors (e.g. event-based cameras or event-based cochlea (audio) sensors), or where binary representations are utilized to represent extracted information from any, not necessarily, binary sensor. Binary representations and sensor data are particularly memory efficient, and in combination with the state memory as described, the applicability of the machine learnable model to real-life problems greatly increases due to the reduced memory footprint.

Optionally, the value is numerically represented in the state memory with a number size (b) which determines a temporal time window $(T=2^b-1)$ for the most recent occurrence. Each memory value of the state memory may thus have a fixed number size, e.g., of b bits, which may be used to provide a temporal time window of $T=2^b-1$. A fixed size state memory and thereby a fixed size memory footprint may be particularly advantageous in real-life applications where memory is limited and the memory size may have to be known before deployment of the machine learned model.

Optionally, if the most recent occurrence for an element exceeds the temporal time window during updating, the most recent occurrence is set to a furthest end of the temporal time window. This may enable the state memory to also adequately deal with occurrences which lie further in the past than the temporal time window.

Optionally, the training of the machine learnable model may further comprise further comprising selecting the number size (b) during the training of the machine learnable model based on statistical information derived from the training data which is indicative of a temporal distribution of occurrences of holding or transitioning to the particular binary state value. Accordingly, the memory footprint may be adapted to a particular application based on statistical information derived from the application. It is noted that alternatively, the number size b may be heuristically chosen during training, for example by an operator of the training system. The number size b may also be encoded in the machine learned model, for example as a parameter of the model. This may enable the machine learned model to be used with a correspondingly configured state memory, e.g., also storing values with the number size b, during inference time.

Optionally, the number size (b) is selected by a trainable parameter of the machine learnable model. The number size itself may also be trained during the training of the machine learnable model, for example by representing the number size as a trainable parameter and formulating a loss function for the selection of the parameter.

Optionally, extracting previous internal state information from the state memory comprises reconstructing one or more previous internal states of the machine learnable model from the values in the state memory representing the respective most recent occurrences. Such reconstruction may for example involve explicitly or implicitly reconstructing individual frames from the state memory. It is noted that a perfect reconstruction of a previous state may be possible until the occurrence of a last event, but that afterwards (i.e., further back in time), such reconstruction may be imperfect. Nevertheless, in case of events occurring seldomly, as is often the case, a sufficiently accurate reconstruction may be obtained by assuming that no event has occurred before the last occurrence of an event within the time window, i.e., that the last occurrence of the event was also the only occurrence of the event within the time window.

Optionally, extracting previous internal state information from the state memory comprises applying a temporal attention model (TMP_ATT(A,X)) to the values in the state memory which generates one or more internal states for the machine learnable model, wherein said one or more generated internal states represent previous internal state information which selected as being relevant in accordance with the temporal attention model. Attention models are conventional in recurrent machine learning where they are used to extract relevant information from time sequential data, and may in the present context be used to extract the previous internal state information from the state memory. More specifically, the attention model may generate one or more internal states for the machine learnable model from the contents of the state memory. Effectively, the internal states generated by the attention model may represent past internal states (by being obtained from the previous internal state information) which are deemed to be of relevance by the attention model for respectively the training of the machine learnable model and the inference by the machine learned model.

Optionally, the temporal attention model is a parameterized attention model, wherein parameters (A) of the parameterized attention model are provided by at least one of a group of:
 a set of trainable parameters of the machine learnable model.
 a set of trainable parameters which are separate of the machine learnable model and jointly trained with the machine learnable model on the training data; and
 a set of predetermined values.

The attention model may thus be a parameterized attention model which may be trained together with the machine learnable model. This may avoid a need for having to heuristically determine parameter values for the attention model.

Optionally, applying the temporal attention model to the values in the state memory comprises normalizing the values, for example with respect to a mean or maximum of all or a subset of the values, so as to provide a temporal normalization of the most recent occurrences. Such normalization may establish temporal invariance and may allow the temporal attention model to be applied given different types of input data, for example to a machine learnable model which is applied to sensor data captured at different measurement intervals, e.g., at 100 ms and 500 ms. Without such normalization, the attention model may have to be configured to the particular type of input data.

Optionally, the state memory comprises, for each element of the internal state, a further value, wherein the state memory is updated during training so that:
 the value is indicative of the most recent occurrence at which the element transitioned to a first binary state value ('0'), and
 the further value is indicative of the most recent occurrence at which the element transitioned to a second binary state value ('1') different from the first binary state value.

While in some embodiment the last occurrence stored in the state memory may be a last occurrence of holding a particular binary state value, e.g., '1', the state memory may also memorize the last occurrence of transitioning to each respective one of the two binary state values. For that purpose, the state memory may comprise two values for each element of the state of the machine learnable model: a first value (also indicated without the prefix 'first') and a second value. Effectively, the state memory may now comprise two binary last memories each counting the last occurrence of transitioning to a respective binary state value. This may represent more information than rather storing only the last occurrence of holding a particular binary state value, and may therefore enable previous state information to be better reconstructed. For example, it may not only allow determining when a last occurrence of an event was, but in some cases also the duration of the event, e.g. the start and end of the event. It is noted that in general, storing the last occurrence of both types of transitions may be particularly useful in cases where information about durations of the last 'ON' (i.e., '1')-sequence is of interest. The signed difference between the stored transition stores this information.

It will be appreciated by those skilled in the art that two or more of the above-mentioned embodiments, implementations, and/or optional aspects of the present invention may be combined in any way deemed useful.

Modifications and variations of any system, any computer-implemented method or any computer-readable medium, which correspond to the described modifications and variations of another one of said entities, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

LIST OF REFERENCE NUMBERS

Figure 1:
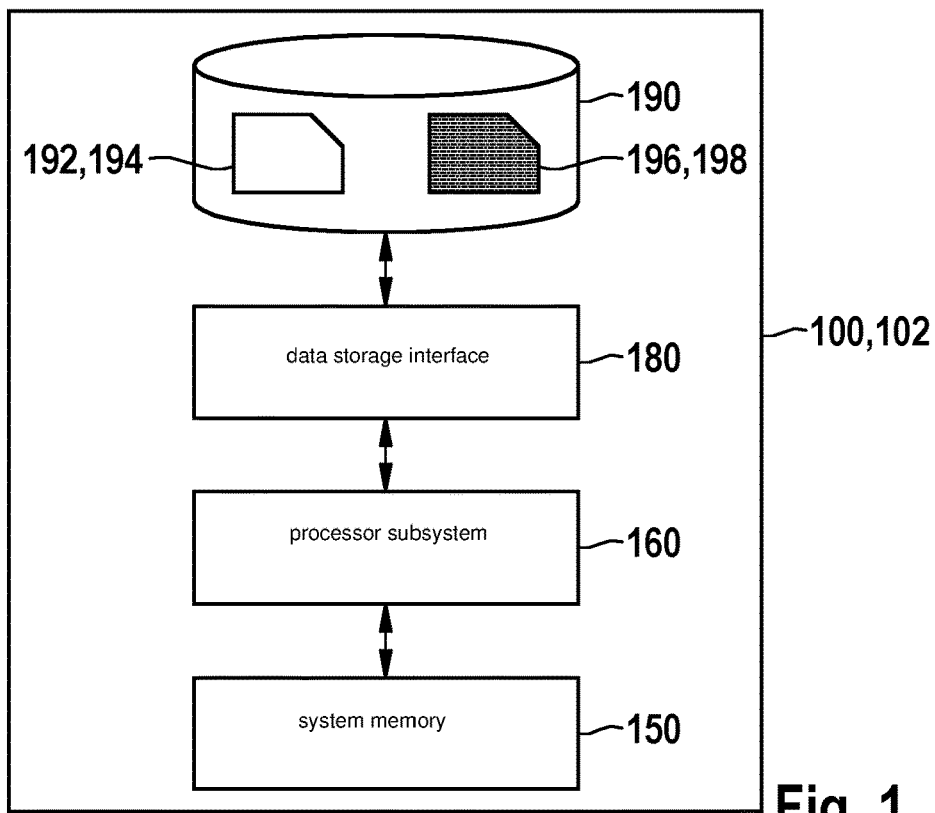
FIG. 1 shows a schematic representation of a system for training a machine learnable model, which also is a schematic representation of a system for using a machine learned model for inference, wherein each system comprises a system memory in which a state memory is provided, e.g., by allocation as a data structure, which efficiently stores previous states of the machine learnable/learned model during training/inference, in accordance with an example embodiment of the present invention.

The following list of reference numbers is provided for facilitating the interpretation of the drawings and shall not be construed as limiting the scope of the present invention.
20 sensor
40 actuator
60 physical environment
100 system for training machine learnable model
102 system for using machine learned model for inference
150 system memory
160 processor subsystem
180 data storage interface
190 data storage
192 training data for training
194 input data for inference
196 data representation of machine learnable model
198 data representation of machine learned model
200 method of training machine learnable model
202 method of using machine learned model for inference
210 accessing training data for training
212 accessing input data for inference
220 training machine learnable model
222 using machine learned model for inference
230 providing state memory
240 extracting previous internal state information
250 updating state memory with current internal state
300 autonomous system
310 motor commands
320 physical environment
330 delayed measurements
400 binary memory frames
410 binary last memory
450 train temporal attention model
500 autonomous system
510 physical environment
520 predict current sensor measurement using binary last memory
530 predict future sensor measurement from current action
540 control of autonomous system based on sensor prediction
550 training loss
600 LSTM layer
610 hidden memory state
620 output state
650 LSTM layer using binary last memory
660 hidden memory state
670 output of binary last memory
680 temporal attention model
685 float to binary conversion
690 binary last memory temporal update
700 system for control or monitoring using machine learned model
720 sensor data interface
722 sensor data
740 actuator interface
742 control data
750 system memory
760 processor subsystem
780 data storage interface
790 data storage
800 physical environment
810 (semi-)autonomous vehicle
820 camera sensor
830 electric motor
900 computer-readable medium
910 non-transitory data

DETAILED DESCRIPTION OF EXAMPLE EMBODIMENTS

Figure 2:
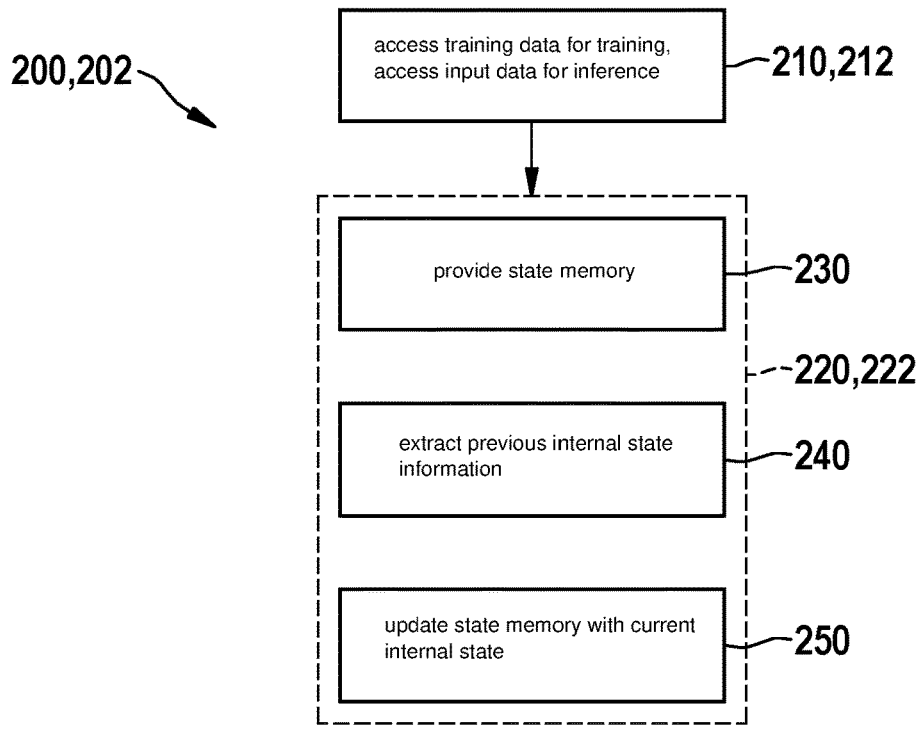
FIG. 2 shows a schematic representation of a computer-implemented method for training a machine learnable model, which also is a schematic representation of a computer-implemented method for using a machine learned model for inference, in accordance with an example embodiment of the present invention.
Figure 10:
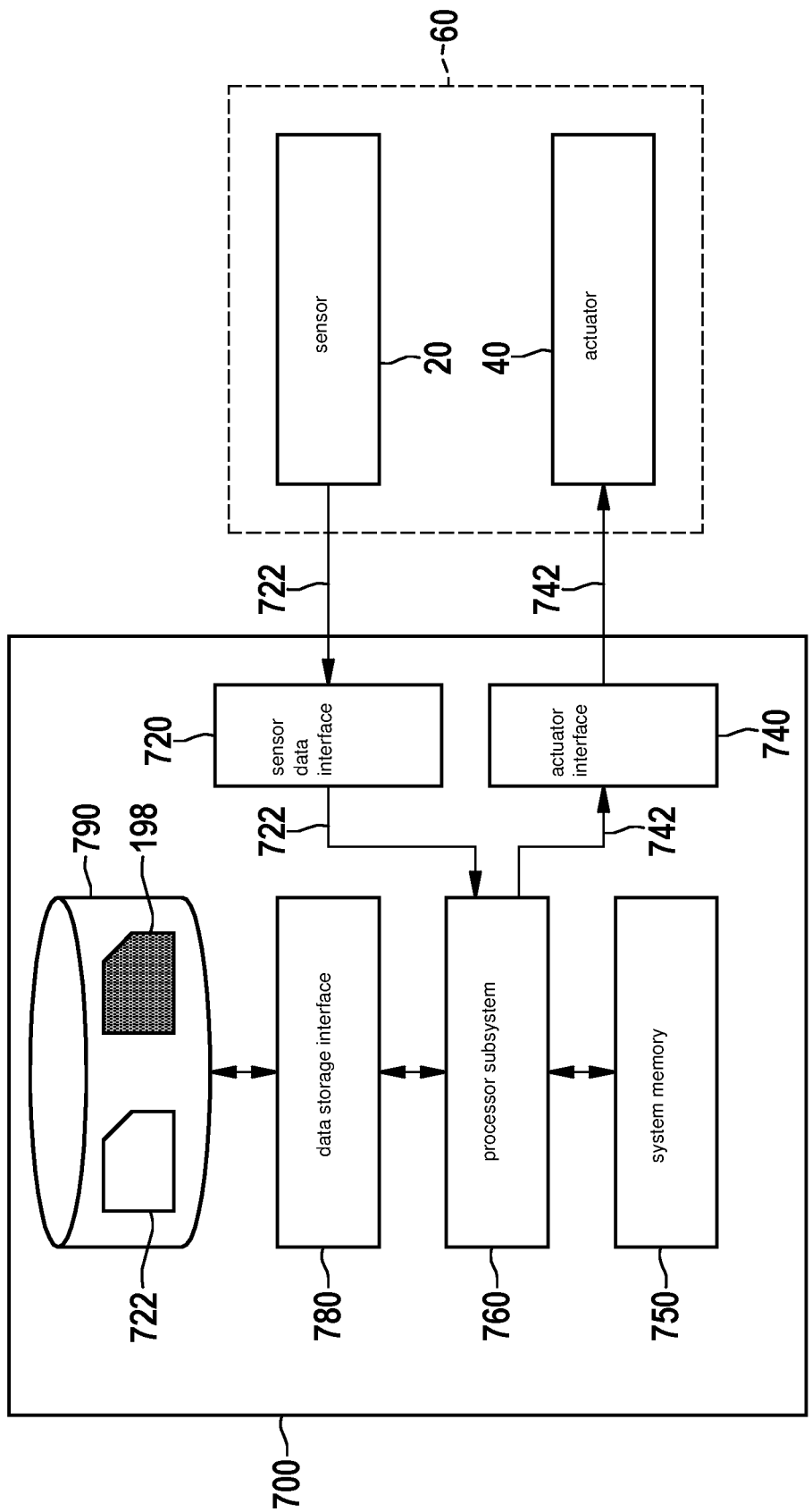
FIG. 10 shows a system for using a machine learned model for inference to control or monitor a physical system (not explicitly shown in FIG. 10) based on sensor data obtained from a sensor in a physical environment in which the physical system operates and by generating control data for an actuator operating in the physical environment.
Figure 11:
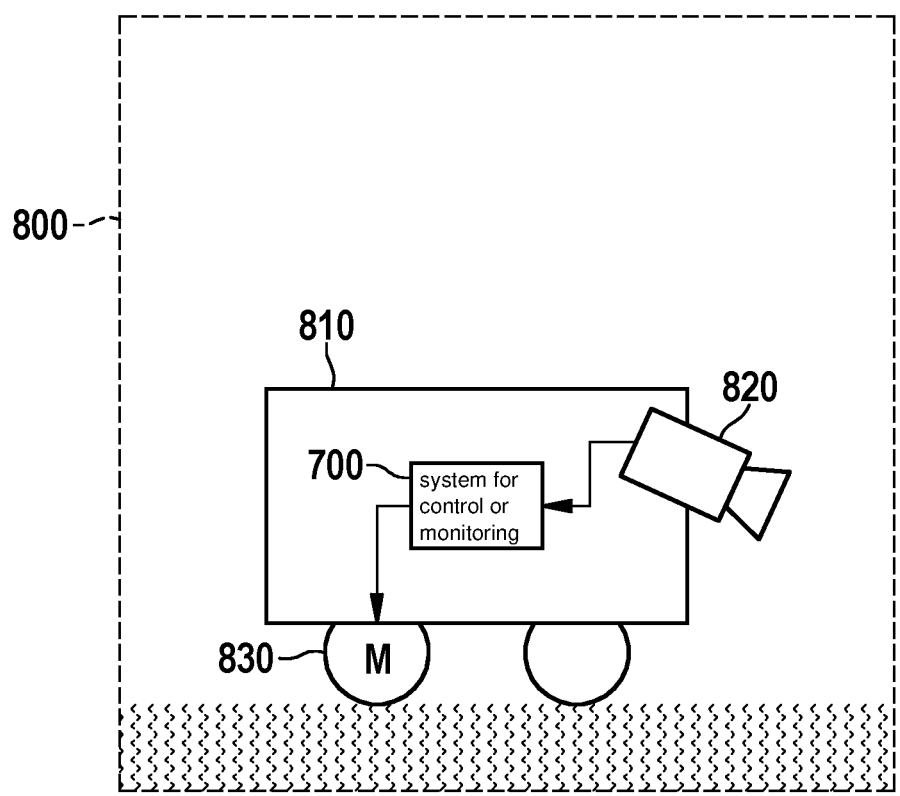
FIG. 11 shows the system as part of an (semi-)autonomous vehicle.

The following provides with reference to FIG. 1 a schematic overview of a system for training a machine learnable model, which also is a schematic representation of a system for using a machine learned model for inference, and with reference to FIG. 2 a schematic overview of a computer-implemented method for training a machine learnable model, which also is a schematic representation of a computer-implemented method for using a machine learned model for inference. Each described system and method uses a state memory which efficiently stores previous states of the machine learn(ed)(able) model during training and inference. The state memory itself is further explained with reference to FIGS. 3-9. FIGS. 10 and 11 further relate to the use of the machine learned model for the control or monitoring of a physical system, such as an (semi-)autonomous vehicle, while FIG. 12 relates to a computer-readable medium comprising a computer program.

FIG. 1 shows a schematic representation of a system 100 for training a machine learnable model, which is also a schematic representation of a system 102 for using a machine learned model for inference. The system 100, 102 may comprise an input interface for accessing input data 192, 194 for the machine learnable model, being either training data 192 or non-training type input data 194, such as sensor data. For example, as illustrated in FIG. 1, the input interface may be constituted by a data storage interface 180 which may access the respective data 192, 194 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, 102, such as a hard drive or SSD, but also an external data storage, e.g., a network-accessible data storage.

In embodiments of the training system 100, the data storage 190 may further comprise a data representation 196 of an untrained version of the machine learnable model which may be accessed by the system 100 from the data storage 190. It will be appreciated, however, that the training data 192 and the data representation 196 of the untrained machine learnable model may also each be accessed from a different data storage, e.g., via a different subsystem of the data storage interface 180. Each subsystem may be of a type as is described above for the data storage interface 180. In other embodiments, the data representation 196 of the untrained machine learnable model may be internally generated by the system 100 on the basis of design parameters for the machine learnable model, and therefore may not explicitly be stored on the data storage 190 or elsewhere.

In embodiments of the system 102 which uses the machine learned model for inference, the data storage 190 may further comprise a data representation 198 of a trained version of the machine learnable model, which is here and elsewhere also referred to as a machine learned model, and which may be accessed by the system 100 from the data storage 190. It will be appreciated, however, that the input data 194 and the data representation 198 of the machine learned model may also each be accessed from a different data storage, e.g., via a different subsystem of the data storage interface 180. Each subsystem may be of a type as is described above for the data storage interface 180. In some embodiments, the input interface for accessing the input data 194 may be a sensor interface for accessing sensor data, as also further described with reference to FIG. 10.

The system 100, 102 is further shown to comprise a system memory 150, which may for example be a random access-based system memory or in general any suitable type of system memory for storing and randomly accessing a data structure representing a state memory of a type as described elsewhere in this specification.

The training system 100 may further comprise a processor subsystem 160 which may be configured to, during operation of the system 100, provide the state memory, e.g., by allocating and providing a corresponding data structure in the system memory 150. The state memory may comprise, for each element of the internal state, a value X(t) which is indicative of a most recent occurrence of the element holding or transitioning to a particular binary state value, wherein the most recent occurrence is expressed as a number of training steps relative to the current training step. The processor subsystem 160 may be further configured to, during the training, in a current training step, extracting, from the state memory, previous internal state information for use in determining a current internal state of the machine learnable model, and after determining the current internal state of the machine learnable model, updating the state memory with the current internal state by, for each element of the internal state, updating the corresponding value of the state memory.

With continued reference to FIG. 1, the system 102 for using the machine learned model for inference may further comprise a processor subsystem 160 which may be configured to, during operation of the system 102, provide a state memory, e.g., by allocating and providing a corresponding data structure in the system memory 150. The state memory may comprise, for each element of the internal state, a value X(t) which is indicative of a most recent occurrence of the element holding or transitioning to a particular binary state value, wherein the most recent occurrence is expressed as a number of inference steps relative to the current inference step. The processor subsystem 160 may be further configured to, during the inference, in a current inference step, extracting, from the state memory, previous internal state information for use in determining a current internal state of the machine learned model, and after determining the current internal state of the machine learned model, updating the state memory with the current internal state by, for each element of the internal state, updating the corresponding value of the state memory.

The operation of the state memory and its role in the training of and inference by the machine learnable model will be further described with reference to FIGS. 3-9.

The training system 100 may further comprise an output interface for outputting a data representation 198 of the machine learned model, this data also being referred to as trained model data 198. For example, as also illustrated in FIG. 1, the output interface may be constituted by the data storage interface 180, with said interface being in these embodiments an input/output ('IO') interface, via which the trained model data 198 may be stored in the data storage 190. For example, the data representation 196 defining the 'untrained' machine learnable model may during or after the training be replaced, at least in part, by the data representation 198 of the machine learned model, in that the parameters of the machine learnable model, such as weights, hyperparameters and other types of parameters of machine learnable models, may be adapted to reflect the training on the training data 192. In other embodiments, the data representation 198 may be stored separately from the data representation 196 of the 'untrained' machine learnable model. In some embodiments, the output interface may be separate from the data storage interface 180, but may in general be of a type as described above for the data storage interface 180.

FIG. 2 shows a schematic representation of a computer-implemented method 200 for training a machine learnable model, which is also a schematic representation of a computer-implemented method 202 for using a machine learned model for inference.

The method 200 is shown to comprise, in a step titled "ACCESSING TRAINING DATA FOR TRAINING", accessing 210 training data for the machine learnable model, wherein the training data comprises a temporal sequence of input data instances. The method 200 is further shown to comprise, in a step titled "TRAINING MACHINE LEARNABLE MODEL", training 220 the machine learnable model in a series of trainings steps on respective input data instances, wherein, in a respective training step, the machine learnable model assumes an internal state which is comprised of or representable as a set of binary values representing respective elements of the internal state, wherein the internal state depends on one or more previous internal states of the machine learnable model. The method 200 is further shown to comprise, in a step titled "PROVIDING STATE MEMORY", providing 230 a state memory which comprises, for each element of the internal state, a value which is indicative of a most recent occurrence of the element holding or transitioning to a particular binary state value, wherein the most recent occurrence is expressed as a number of training steps relative to the current training step. The method 200 is further shown to comprise, during the training and in a current training step thereof, in a step titled "EXTRACTING PREVIOUS INTERNAL STATE INFORMATION", extracting 240, from the state memory, previous internal state information for use in determining a current internal state of the machine learnable model, and in a step titled "UPDATING STATE MEMORY WITH CURRENT INTERNAL STATE" and after determining the current internal state of the machine learnable model, updating 250 the state memory with the current internal state by, for each element of the internal state, updating the corresponding value of the state memory.

The method 202 corresponds to the method 200 in as far as described with reference to FIG. 2, except that the method uses the machine learned model in step 222 for inference instead of training the machine learnable model and that the accessing step 210 is replaced by a step titled "ACCESSING INPUT DATA FOR INFERENCE" which comprises accessing 212 input data for the machine learned model, wherein the input data comprises a temporal sequence of input data instances. Otherwise, the above description of FIG. 2 applies, except for the training and training steps now being inference and inference steps.

The following examples describe the state memory and its use in more detail. However, the actual implementation of the state memory and its use may be carried out in various other ways, e.g., on the basis of analogous mathematical concepts. Various other embodiments are within reach of the skilled person based on this specification.

Binary (sparse) representations [1] may be used to encode information. For binary representations, the activation $x_i(t)$ of a single unit of a machine learnable model (e.g., a neuron) may only take the values 0 or 1. The following only considers such binary states $x(t)$ of a machine learnable model. However, intermediate computation results may not need to be binary, but for example floating-point numbers. For example, in case of a linear mapping $y=W*x(t)$, where W is a parameter matrix, the input $x(t)$ may be binary, but the (intermediate) result y may be a floating-point vector which may, for example, rounded again to a binary representation of the machine learnable model's current state:

$$y_i \geq 0 \rightarrow x_i(t+1):=1$$

$$y_i < 0 \rightarrow x_i(t+1):=0$$

Figure 3:
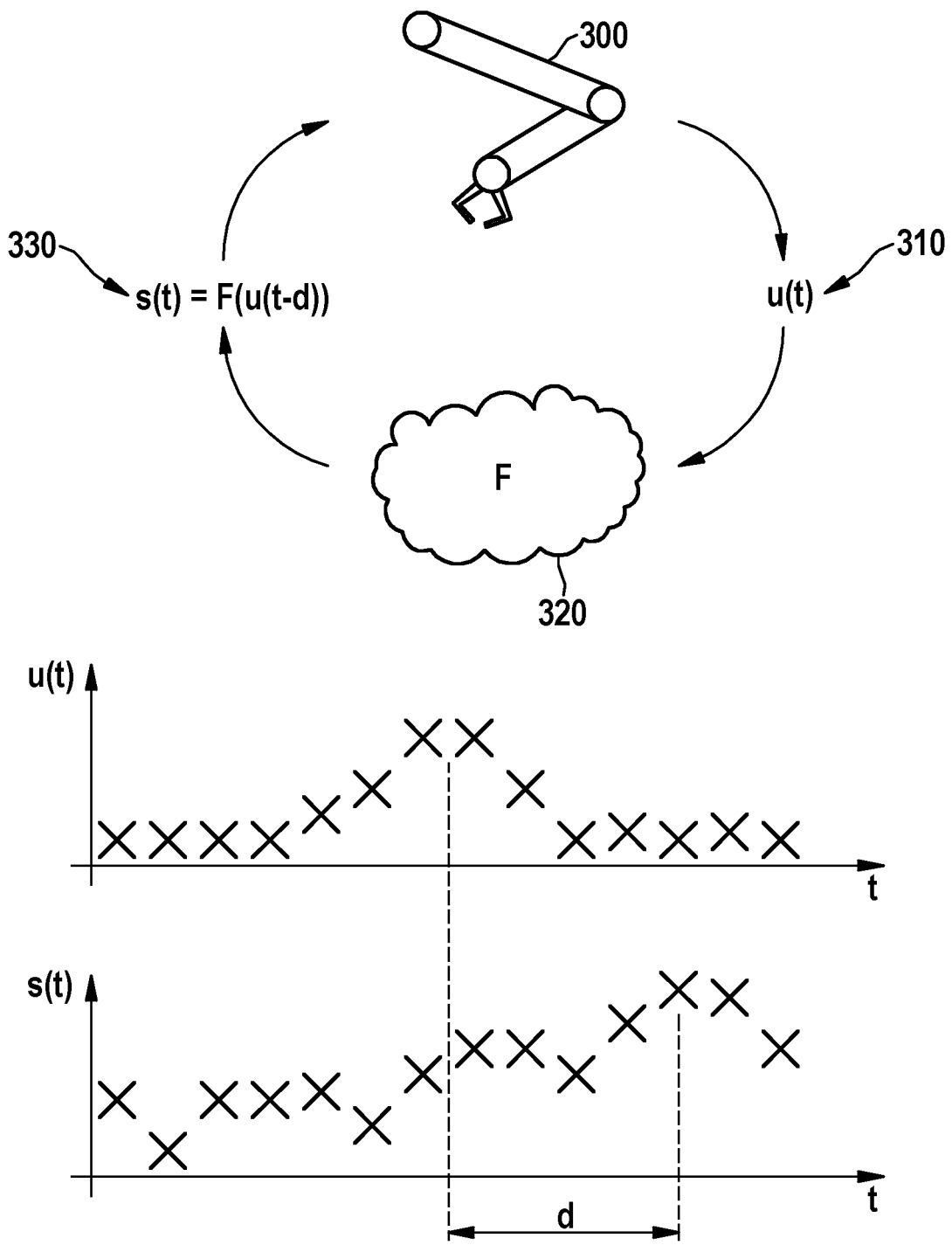
FIG. 3 illustrates a delayed transformation problem, in which an autonomous system performs an action u(t) which interacts with the physical environment and affects, with a certain delay d, the sensor measurements of the autonomous system s(t)=F(u(t−d)), where F is an unknown and complex function of the physical environment.

FIG. 3 illustrates a delayed transformation problem, illustrating one of the relevant application areas for the state memory as described in this specification. This problem relates to following: a challenge for autonomous systems may be to estimate and model temporal delays. For example, a current action u(t) 310, e.g., as affected by an actuator of the autonomous system 300, may casually affect the sensor measurements s(t) 330 of the autonomous system with some time delay d. The sensor measurement may be partially affected by the system's actions u(t) through complex real-world physics F of the physical environment 320 in which the current action u(t) is performed:

$$s(t)=F(u(t-d))$$

Here, F may be an unknown and complex function of the physical environment 320. In FIG. 3, this time delay d is illustrated by two graphs, representing the current action u(t) and the sensor measurement s(t). Here, the time axis t runs from past (left) to future (right). For simplicity, is assumed that the delay d is constant and independent from the action u, which sometimes is the case but not necessarily has to be the case.

A goal may be to have a machine learnable model learn to predict the future sensor measurement while F and d are both unknown. For this purpose, recurrent and similar types of machine learnable models may be used, in which a current state depends on past state information, thereby effectively providing the machine learnable model with a memory. To be able to cope with a delay d, the memory of the machine learnable model may need to have an appropriate memory depth. Namely, the past states of the machine learnable model need to be stored, both during training and inference, for as long as is necessary to account for the delay d, e.g., for at least d timesteps of the training/inference if d is expressed correspondingly. The state memory as described in the following and elsewhere in this specification provides an efficient way of storing past state information.

Figure 4:
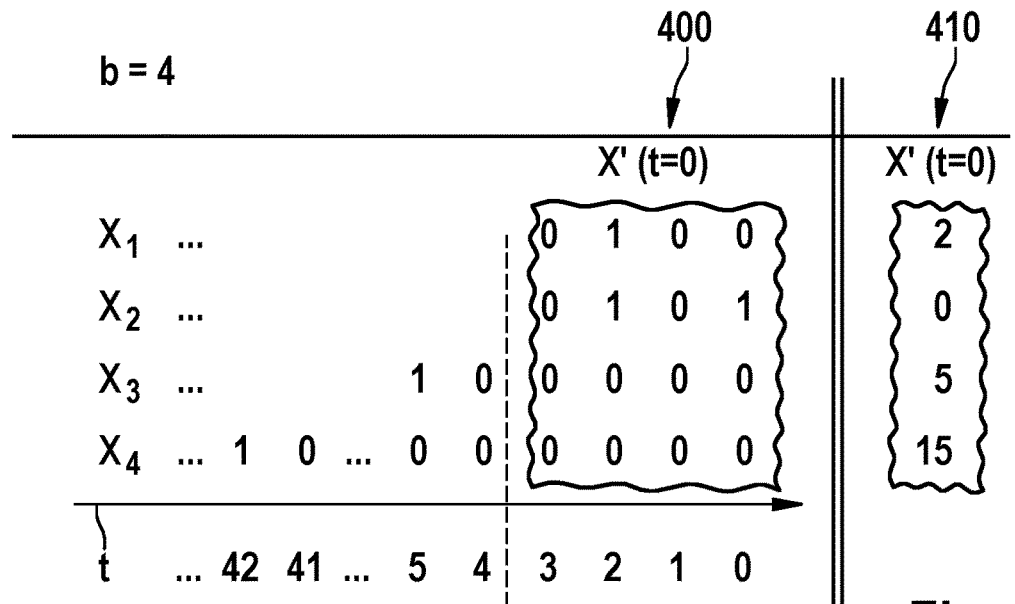
FIG. 4 shows an example in which a 4-dimensional binary sequence x=($x_1$, $x_2$, $x_3$, $x_4$) is stored using 4 bits (b=4), comparing on the left hand side four binary memory frames and on the right hand side the state memory ('binary last memory') in which the 4 bits are used to store a last occurrence of an on-state ('1') as an integer.

FIG. 4 shows an example in which a 4-dimensional binary sequence of states $x=(x_1, x_2, x_3, x_4)$, e.g., a four-dimensional state vector, is to be stored. In this example, on the left-hand side, the storage of individual binary frames is shown, which is here and elsewhere also referred to as a 'binary dense memory' 400 (BDM). On the right-hand side, the storage of the past state information is shown using the state memory, also referred to as 'binary last memory' 410 (BLM). In this example, 4 bits (b=4) are used for each memory. It can be seen that in the case of the binary dense memory 400, this means that four binary frames may be stored, i.e., the last four binary states. The binary last memory 410 may replace the b bit dense memory, which encodes the last b=4 frames, with another memory structure which also uses b bits but instead of encoding all b previous states, the b bits may be used in this example to store a single (integer) duration until the last onset, which is in this and some other examples the last time of a unit holding the binary value '1', e.g., $x_i(t)=1$.

As such, this last onset is the last moment in time at which the respective unit assumed the particular binary state value '1'. This state may represent an event, e.g., as detected by an event-based sensor, and which resulted in an activation of a particular unit of the machine learnable model, e.g., causing the state to assume the binary state value '1'.

Hence, a single b bit integer unit (e.g., b=4) may be used for every binary state element/unit of the machine learnable model to encode the (frame) duration since this units last onset. For example, if the memory of a unit is $X_i(t)=0$ at time frame t, this may mean that this unit is active at t: $x_i(t)=0$, while a memory of $X_i(t)=5$ may mean that $x_i$ was activated 5 time frames ago: $x_i(t-5)=x_i(t-X_i(t))=1$ but was inactive in the frames in between: $x_i(t-5: t)=(1, 0, 0, 0, 0, 0)$ and hence that $X_i(t-1)=4, X_i(t-2)=3, X_i(t-3)=2, X_i(t-4)=1, X_i(t-5)=0$. As soon as $x_i$ is activated again at some future time frame $t_{new}$, the corresponding value stored in the state memory may be overwritten $X_i(t_{new})=0$ and the duration for this new onset may be stored in the state memory. More generally, this memory X, of the time duration since the last event may be updated as:

$$x_i(t)=1 \rightarrow X_i(t):=0$$

$$x_i(t)=0 \rightarrow X_i(t):=\min\{2^b-1, X_i(t-1)+1\}$$

Note that for the BDM 400, the used bits b directly yield the time horizon of the dense memory T=b, e.g., T=4 for the FIG. 4 example, while for the BLM 410, the maximally covered delay is $T=2^b-1$ which is exponentially larger than b, for growing b.

Similar to the BDM, the BLM 410 encodes not only the samples themselves, but also their temporal order, e.g. which states temporally precede which other states. For the BLM 410, the order may be encoded transparently via the different delays of the states.

Figure 5:
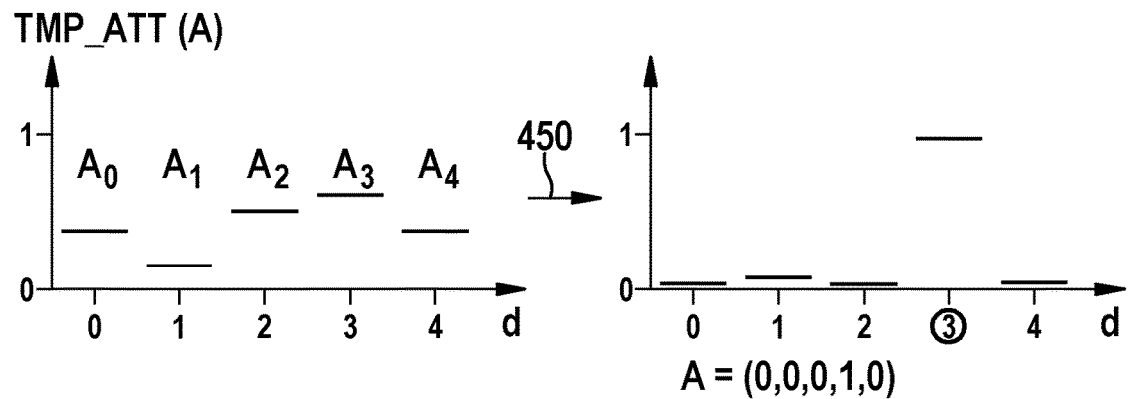
FIG. 5 shows an example of a temporal attention model which has learned to extract the binary state x(t−3) from 3 frames before from the binary last memory.
Figure 5:
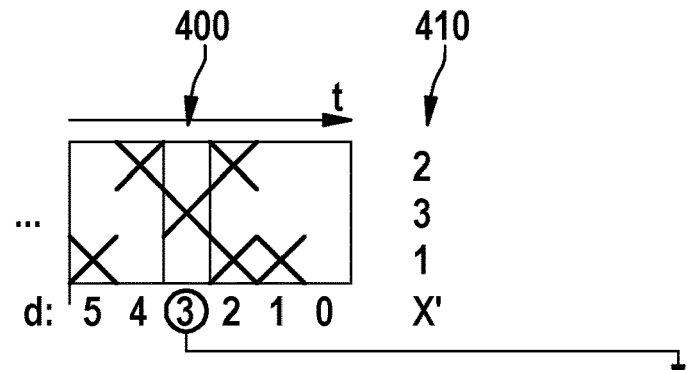

FIG. 5 relates to so-called 'temporal aware computations' in which past state information may again be extracted from the state memory, e.g., the BLM, using a temporal attention model (TMP_ATT) which may be trainable and which may generate one or more internal states for the machine learnable model. The one or more generated internal states thus represent previous internal state information, which may be selected as being relevant in accordance with the temporal attention model, and may be used by the machine learnable model to determine its current internal state. FIG. 5 shows an example of a trainable temporal attention model TMP_ATT which has learned to extract the binary state x(t−3) from 3 frames before from the binary last memory. In general, this temporal attention model may accept parameters A and the values X stored in the BLM as input:

$$y=\text{TMP\_ATT}(A,X)$$

The temporal attention model, which may in the following also be referred to as an attention mechanism or as an attention function, may function like an activation function which may be applied coefficient-wise on every X and may yield one or more binary states y which may have the same dimension as X. Broadly speaking, TMP_ATT may extract a binary state y from the memory X, with the extracted binary state y being the state some frames ago or a combination over several frames ago. The way TMP_ATT may select this stored information may be parameterized by A. Many different types of temporal attention models may be used, which may be categorized in at least two different classes:

trainable: the parameters A may be trained, for example in a similar manner and in parallel to the machine learnable model, for example to its neural network parameters. The parameters A may then be constant after the training. For example, TMP_ATT may have learned to always extract the state for a certain delay d from X.

not-trainable: the parameters A may not be trained and may either be constant or themselves produced during runtime, e.g., during training or interference, e.g., as activation of a layer in the network. A beneficial use of a not-trainable parametrization of TMP_ATT may be the following: the delay d for which the state may be extracted from the BLM X may vary during runtime and may for example be dependent on some other network state A=A(x(t)). For the BLM, the temporal attention mechanism TMP_ATT may be used to extract information from X and generate a new binary state y which may then, for example, be used as input to a parameterized network layer, e.g., W*TMP_ATT(A,X (t)).

FIG. 5 shows an example of a trainable TMP_ATT which has learned, by way of training 450, to extract a delayed state, namely with d=3, by learning to parametrize A as a piece-wise step function over potential delays. Shown in the left-hand upper side are initial values for the individual parameters of $A=(A_0, A_1, A_2, A_3, A_4)$, which after the training 450 have resulted in A=(0.0, 0.0, 0.0, 1.0, 0.0), indicating that the temporal attention model has learned to extract a delayed state with d=3. This extraction is illustrated in the left-hand lower side, illustrating both the contents of the BLM 410 and the corresponding BDM 400. Here, binary state values of '1' are shown as 'x'. It can be seen that the temporal attention model TMP_ATT has learned to provide as output the delayed state of 3 frames ago.

Another beneficial use of a temporal attention model is that of temporal scaling of the input BLM X. In a simple example, TMP_ATT may first temporally normalize the input BLM X, e.g. using its mean or maximum duration:

$$X = \frac{X}{\text{mean}(X)} \text{ or } X = \frac{X}{\text{max}(X)}$$

before extracting stored information for certain (then normalized) delays. This normalization may introduce a temporal invariance of the generated output state with respect to the input BLM X. As such, for certain temporal scaling, e.g., using the mean or the maximum, the relative temporal durations of states in the sequence may stay constant.

It is noted that instead of using a temporal attention model to extract previous internal state information from the state memory, such previous internal state information may also be extracted in any other way, e.g., by manually designed heuristics, such as a rule-based system.

For example, such heuristics may be designed to reconstruct one or more previous internal states of the machine learnable model from the values in the state memory representing the respective most recent occurrences. Such a reconstruction may for example reconstruct four binary state frames from X(t=0)=(2, 0, 5, 15), for example, by assuming that the activation represented by the stored value is the only activation within the reconstructed time window, e.g., that the binary state values preceding a last activation are '0'. In many cases, the reconstruction error may be small, e.g., if events are incidental seldom and only short-lived, and/or the binary state values preceding a last activation may be of lesser relevance to the training of or inference by the machine learnable model.

Figure 6:
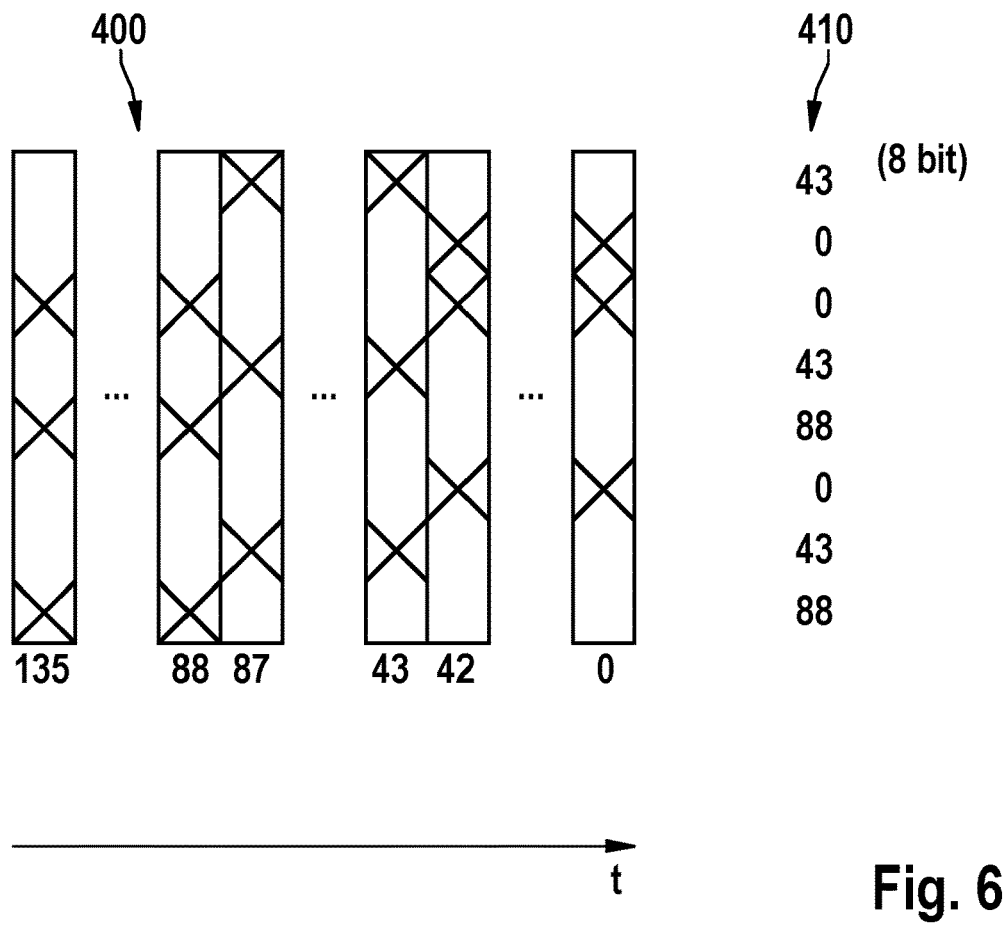
FIG. 6 shows an example of a binary sequence containing temporally constant states x(t) of dimension 8 and in which a binary last memory of 8 bits is used.

FIG. 6 shows an example of a binary sequence containing states x(t) of dimension 8 and in which a binary last memory 410 of 8 bits is used (the state dimension and BLM bits are only equal by coincidence), which is shown next to a binary dense memory 400 of 136 bits. In this example, the BLM 410 can store delays between 0 and 255 and thereby capture the delays of 43 and 88 which are needed to represent the binary sequence of FIG. 6. It can be seen that the 8-bit BLM 410 can reliably store the binary sequence. A corresponding BDM would have needed at least 88 bits for capturing the binary sequence.

Figure 7:
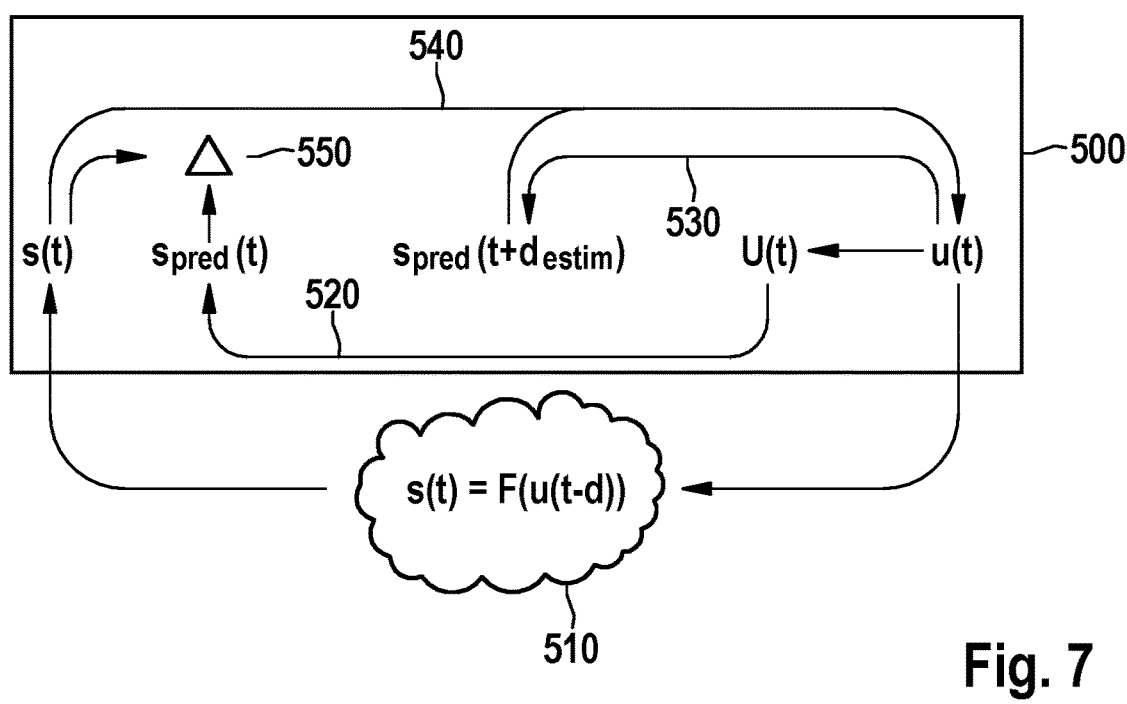
FIG. 7 illustrates an application of estimating a delayed transformation and using the learned past-to-present prediction to generate a present-to-future prediction in order to solve a predictive control task, such as control of an autonomous system.

FIG. 7 illustrates an application of estimating a delayed transformation, e.g., as previously described with reference to FIG. 3, and using a learned past-to-present prediction to generate a present-to-future prediction in order to address a predictive control task, such as control of an autonomous system. In general, in cases of a delay transformation, the temporal delay d may either be constant and independent from time and also its estimate $d_{estim}$ may independent from time, or d may depend on some environmental state (e.g., the actual action of the system or some other environmental state) and hence, also the estimate may vary as a function of time: $d_{estim}(t)=d_{estim}(X(t))$.

The first variant of temporally constant delay is a sub-case of the more general temporally dependent variant but may be implemented in a more efficient way. Namely, in case of a temporally constant delay d, the delay estimate may be implemented as a trainable parameter of the machine learnable model and may stay constant after training and during inference. In case of a varying, time dependent delay d(t), the machine learnable model may compute an estimate of the delay $d_{estim}(t)$ at every time step.

FIG. 7 gives a schematic overview for the case of a trainable and constant $d_{estim}$. As in the case of FIG. 3, this application concerns an autonomous system 500 which performs actions u(t) in a physical environment 510, e.g., via an actuator, and obtains sensor measurements s(t). In this example, a machine learnable model is learned to predict 520 the current sensor measurement s(t) by $s_{pred}(t)$ using a past state u(t−d) (in particular its BLM-stored representation U(t)) and a training loss 550. This past-to-present function, as learned by the machine learnable model, may be used to predict 530 a future sensor state $s_{pred}(t+d\_estim)$ from a present control action u(t). The anticipated sensor signal may now be used for predictive control 540 of the actuator or for similar purposes.

As also indicated elsewhere, since the BLM stores past state information, it is particularly useful in applications where temporal information, such as sensor data, is processed and decision making and/or control is based on temporal information. For such applications, often recurrent machine learnable models, such as neural networks, are used.

Figure 8:
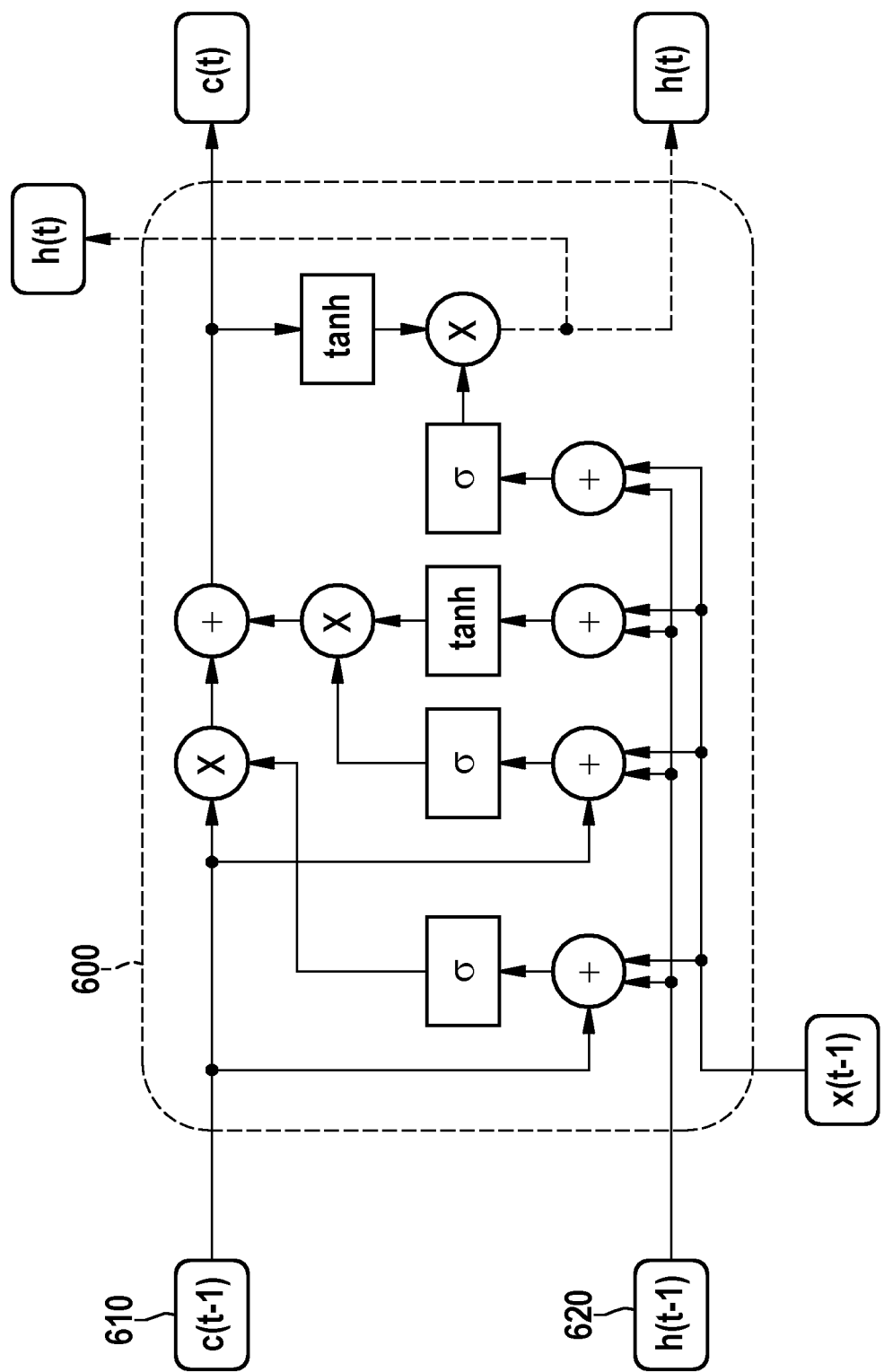
FIG. 8 shows a standard LSTM layer.

FIG. 8 shows a standard LSTM layer 600 which is frequently used in recurrent neural networks. The LSTM layer 600 is shown to comprise a hidden memory state 610 and an output state H 620, representing an output of a previous application of the LSTM layer 600 and thus essentially a previous state which would conventionally be stored integrally.

Figure 9:
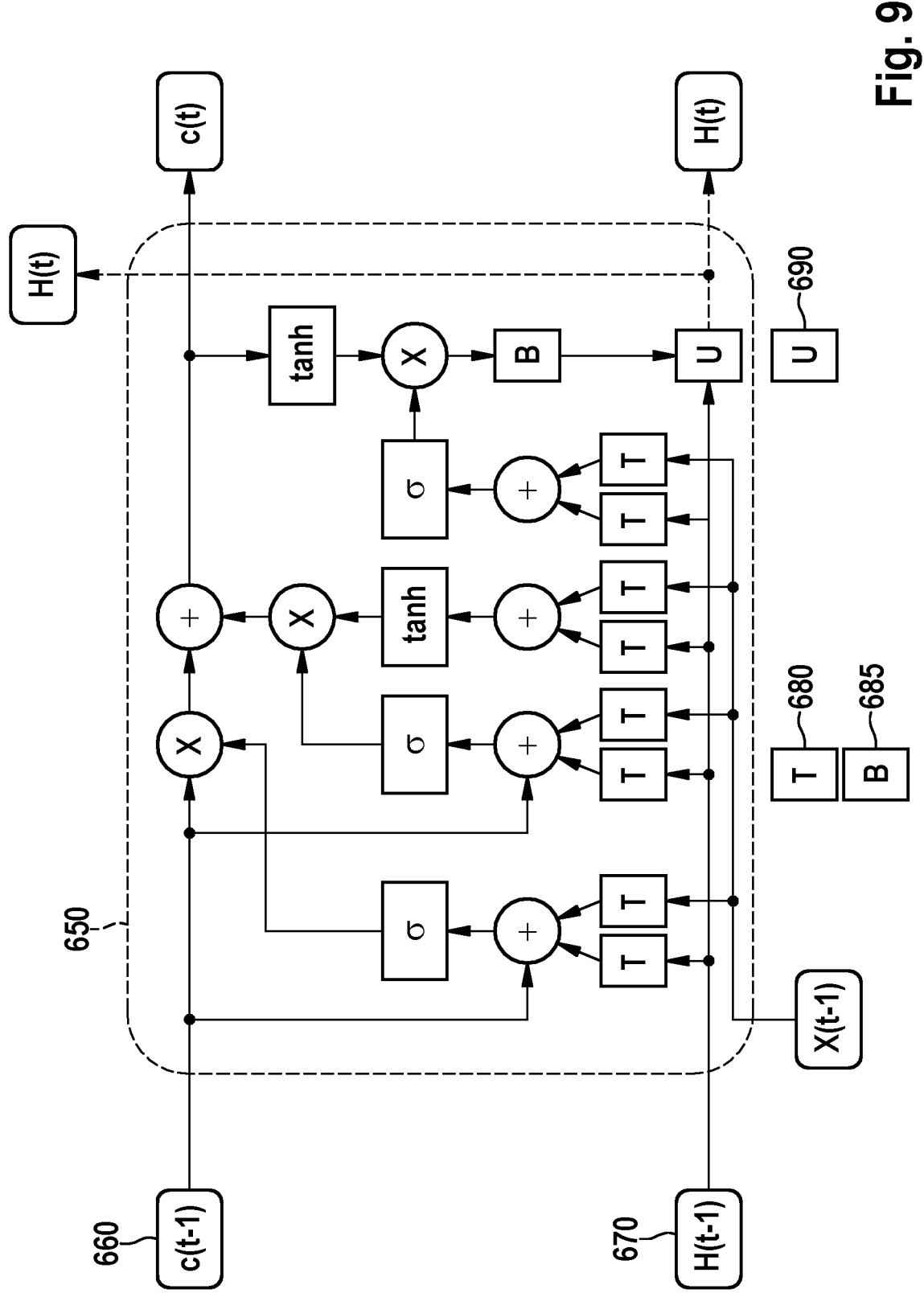
FIG. 9 shows a modified LSTM layer which incorporates a binary last memory.

FIG. 9 shows a modified LSTM layer 650 which incorporates a binary last memory. Like the standard LSTM layer 600, the modified LSTM layer 650 comprises a hidden memory state 660. However, the previous output state H 620 which is used as input to the LSTM layer 650 is now replaced by an output 670 of a binary last memory. In addition, a temporal attention model T 680 is used to extract past state information from the output of the binary last memory. The temporal attention model T 680 may be a parameterized TMP_ATT( ) function extracting or learning to extract parts from the binary last memory. The current state of the modified LSTM layer 650, which may comprise floating point values, may be converted via a float-to-binary conversion B 685. For example, the conversion B may comprise applying an element-wise step function to the floating-point values or a Bernoulli distribution parameterized by the output of the output gate. Finally, the resulting binary state values may be used to update 690 the binary last memory, e.g., in a manner as described elsewhere in this specification. For applications where standard LSTM are deployed, the BLM LSTM variant may be used to improve performance, e.g., due to temporal memory of layer input X and output H, and reduced memory footprint due to only binary input/output.

It is noted that while some of the examples described in this specification relate to the storing, in the state memory, of the most recent occurrence of a state element having the binary state value '1', the state memory may also store the most recent occurrence of the state element having the binary state value '0'. Alternatively, the state memory may store a most recent occurrence of a state element transitioning to a particular binary state value, thereby encoding the last change to a particular binary state value, or in general the most recent occurrence of any transition to another binary state value. Such type of memory may also be relevant for some applications. Another example is that the state memory comprises, for each element of the internal state, a further value. The state memory may then be updated at each step so that the (first) value is indicative of the most recent occurrence at which the element transitioned to a first binary state value, such as '0', and the further value is indicative of the most recent occurrence at which the element transitioned to a second binary state value, e.g., '1', which is different from the first binary state value. Accordingly, the state memory may store the last occurrence of each type of transition.

FIG. 10 shows a system 700 for controlling or monitoring a physical system using a machine learned model. Such a system 700 may represent a specific example of a system configured to use the machine learned model for inference purposes. The system 700 may comprise an input interface 780 for accessing a data representation 198 of the machine learned model as may be generated by the system 100 of FIG. 1 or the method 200 of FIG. 2 or as described elsewhere. For example, as also illustrated in FIG. 10, the input interface may be constituted by a data storage interface 780 which may access the machine learned model 198 from a data storage 790. In general, the input interface 780 and the data storage 790 may be of a same type as described with reference to FIG. 1 for the input interface 180 and the data storage 190. FIG. 10 further shows the data storage 792 comprising input data 722 to be used as input to the machine learned model to obtain output data representing an inference of the machine learned model. For example, the input data 722 may be or may comprise sensor data obtained from one or more sensors. A specific example, the input data 722 may represent an output of a sensor-based observation of a current state of the physical system, e.g., a sensor measurement, and the machine learned model may provide an inference based on the current state of the physical system, which may in a specific example be an inference relating to a future state of the physical system. In some embodiments, the sensor data as input data 722 may also be received directly from a sensor 20, for example via a sensor interface 720 of via another type of interface instead of being accessed from the data storage 790 via the data storage interface 780.

The system 700 may further comprise a processor subsystem 760 which may be configured to, during operation of the system 700, apply the machine learned model to the input data 722 to obtain output data representing an inference by the machine learned model, wherein said applying may comprise providing and using a state memory as described elsewhere in this specification. The state memory may be allocated as a data structure in the system memory 750. The obtained output data may take various forms, and may in some examples be a direct output of the system 700. In other examples, which are also described in the following, the system 700 may output data which is derived from the inference of the machine learned model, instead of directly representing the inference.

It will be appreciated that the same considerations and implementation options apply for the processor subsystem 760 as for the processor subsystem 160 of FIG. 1. It will be further appreciated that the same considerations and implementation options may in general apply to the system 700 as for the system 100 of FIG. 1, unless otherwise noted.

FIG. 10 further shows various optional components of the system 700. For example, in some embodiments, the system 700 may comprise a sensor data interface 720 for directly accessing sensor data 722 acquired by a sensor 20 in an environment 60. The sensor 20 may but does not need to be part of the system 700. The sensor 20 may have any suitable form, such as an image sensor, a lidar sensor, a radar sensor, a pressure sensor, a contain temperature sensor, etc. In some embodiments, the sensor data 722 may sensor measurements of different physical quantities in that it may be obtained from two or more different sensors sensing different physical quantities. The sensor data interface 720 may have any suitable form corresponding in type to the type of sensor, including but not limited to a low-level communication interface, e.g., based on I2C or SPI data communication, or a data storage interface of a type as described above for the data storage interface 780.

In some embodiments, the system 700 may comprise an actuator interface 740 for providing control data 742 to an actuator 40 in the environment 60. Such control data 742 may be generated by the processor subsystem 760 to control the actuator 40 based on one or more inferences, as may be generated by the machine learned model when applied to the input data 722. For example, the actuator 40 may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 11 for an (semi-)autonomous vehicle.

In other embodiments (not shown in FIG. 10), the system 700 may comprise an output interface to a rendering device, such as a display, a light source, a loudspeaker, a vibration motor, etc., which may be used to generate a sensory perceptible output signal which may be generated based on one or more inferences by the machine learned model. The sensory perceptible output signal may be directly indicative of the inferences by the machine learned model, but may also represent a derived sensory perceptible output signal, e.g., for use in guidance, navigation or other type of control of the physical system.

In general, each system described in this specification, including but not limited to the systems 100, 102 of FIG. 1 and the system 700 of FIG. 10, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 102, 700 may be part of vehicle, robot or similar physical entity, and/or may be represent a control system configured to control the physical entity.

FIG. 11 shows an example of the above, in that the system 700 is shown to be a control system of an (semi-)autonomous vehicle 810 operating in an environment 800. The autonomous vehicle 810 may be autonomous in that it may comprise an autonomous driving system or a driving assistant system, with the latter also being referred to as a semiautonomous system. The autonomous vehicle 810 may for example incorporate the system 700 to control the steering and the braking of the autonomous vehicle based on sensor data obtained from a camera sensor 820 integrated into the vehicle 810. For example, the system 700 may control an electric motor 820 to perform (regenerative) braking in case the autonomous vehicle 810 is expected to collide with a traffic participant. The system 700 may control the steering and/or braking to avoid collision with the traffic participant. For that purpose, the system 700 may infer a current or future state of the vehicle with respect its environment, including the traffic participant, based on the sensor data obtained from the video camera. If the state of the vehicle, e.g., its position relative to the traffic participant, is expected to result in a collision, the system 700 may take corresponding action, for example by the aforementioned steering and/or braking.

Figure 12:
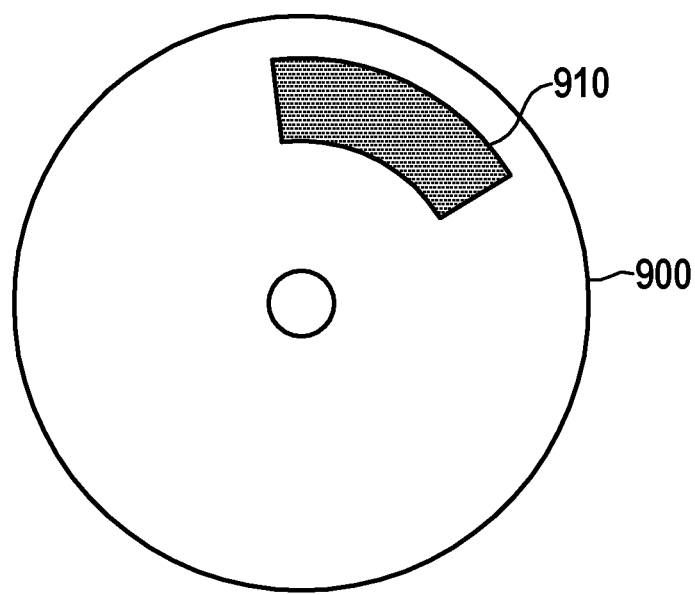
FIG. 12 shows a computer-readable medium comprising data.

Each method, algorithm or pseudo-code described in this specification may be implemented on a computer as a computer implemented method, as dedicated hardware, or as a combination of both. As also illustrated in FIG. 12, instructions for the computer, e.g., executable code, may be stored on a computer-readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 12 shows an optical disc 910. In an alternative embodiment of the computer-readable medium 900, the computer-readable medium may comprise model data 910 defining a machine learned model as described elsewhere in this specification.

Examples, embodiments or optional features, whether indicated as non-limiting or not, are not to be understood as limiting the scope of the present invention.

It is noted that systems and computer-implemented methods are described for training a machine learnable model and for using the machine learned model for inference, both of which using only limited memory resources. During training and inference, the machine learnable model uses previous state information. A state memory is provided which efficiently stores this previous state information. Instead of storing each previous state individually and integrally, for each element of the internal state, a value is stored in the state memory which is indicative of a most recent occurrence of an element of the internal state of the machine learnable model holding or transitioning to a particular binary state value. This type of state memory has been found to be highly efficient for storing state information when the states of the machine learnable model are representable as binary values and when states infrequently hold or transition to a particular binary state value, e.g., if sensor events are infrequent. Due to the reduced memory footprint during training and inference, the applicability of the machine learnable model to real-life problems is increased.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device enumerating several means, several of these means may be embodied by one and the same item of hardware. The mere fact that certain measures are recited in mutually separately does not indicate that a combination of these measures cannot be used to advantage.

What is claimed is:

1. A computer-implemented method for training a machine learnable model using limited memory resources, comprising the following steps:
    accessing training data for the machine learnable model, wherein the training data includes a temporal sequence of input data instances;
    training the machine learnable model in a series of trainings steps on respective input data instances, wherein, in a respective training step of the training steps, the machine learnable model assumes an internal state which includes or is representable as a set of binary state values representing respective elements of the respective internal state, wherein the respective internal state depends on one or more previous internal states of the machine learnable model;
    providing a state memory which includes, for each element of the elements of the respective internal state, a respective element value which is indicative of a most recent occurrence of the respective element holding or transitioning to a particular one of the binary state values, wherein the most recent occurrence is expressed as a number of training steps relative to a current training step; and
    during the training, in the current training step:
        extracting, from the state memory, previous internal state information for use in determining a current internal state of the machine learnable model; and
        after determining the current internal state of the machine learnable model, updating the state memory with the current internal state by, for each element of the elements of the current internal state, updating the respective element value of the respective element in the state memory;
    wherein the method includes at least one of the following three features (I)-(III):
        (I) when, during the updating, the most recent occurrence for the respective element exceeds a defined temporal time window for the most recent occurrence, the most recent occurrence for the respective element is set to a furthest end of the temporal time window;
        (II) the method further comprises, during the training of the machine learnable model and based on statistical information derived from the training data that is indicative of a temporal distribution of occurrences of holding or transitioning to the particular one of the binary state values, selecting a number size with which to numerically represent the element value in the state memory, the number size determining the temporal time window; and
        (III) the extracting of the previous internal state information from the state memory includes applying to the values in the state memory a temporal attention model that generates for the machine learnable model one or more generated internal states representing previous internal state information selected as being relevant in accordance with the temporal attention model, the applying of the temporal attention model including normalizing the values in the state memory to provide a temporal normalization of the most recent occurrences.

2. The computer-implemented method according to claim 1, wherein the element value is numerically represented in the state memory with the number size which determines the temporal time window for the most recent occurrence.

3. The computer-implemented method according to claim 2, wherein, when, during the updating, the most recent occurrence for the respective element exceeds the temporal time window, the most recent occurrence for the respective element is set to the furthest end of the temporal time window.

4. The computer-implemented method according to claim 2, further comprising:
    the selecting of the number size during the training of the machine learnable model based on the statistical information derived from the training data that is indicative of the temporal distribution of occurrences of holding or transitioning to the particular binary state value.

5. The computer-implemented method according to claim 4, wherein the number size is selected by a trainable parameter of the machine learnable model.

6. The computer-implemented method according to claim 1, wherein the extracting of the previous internal state information from the state memory includes reconstructing one or more previous internal states of the machine learnable model from the values in the state memory representing the respective most recent occurrences.

7. The computer-implemented method according to claim 1, wherein the extracting of the previous internal state information from the state memory includes applying to the values in the state memory a temporal attention model that generates for the machine learnable model one or more generated internal states representing previous internal state information selected as being relevant in accordance with the temporal attention model.

8. The computer-implemented method according to claim 7, wherein the temporal attention model is a parameterized attention model, wherein parameters of the parameterized attention model are provided by at least one of:
   a set of trainable parameters of the machine learnable model;
   a set of trainable parameters which are separate of the machine learnable model and jointly trained with the machine learnable model on the training data; and
   a set of predetermined values.

9. The computer-implemented method according to claim 7, wherein the applying of the temporal attention model to the values in the state memory includes the normalizing of the values so as to provide the temporal normalization of the most recent occurrences.

10. The computer-implemented method according to claim 9, wherein the normalizing of the values is with respect to a mean or maximum of all or a subset of the values.

11. The computer-implemented method according to claim 1, wherein the state memory:
   includes, for each of the elements of the internal state, the further value; and
   is updated during the training so that:
      the element value is indicative of the most recent occurrence at which the element (i) transitioned to the first of the binary state values and (ii) therefore could not be at the second of the binary state values, which is different than the first of the binary state values; and
      the further value is indicative of the most recent occurrence at which the element (i) transitioned to the second of the binary state values and (ii) therefore could not be at the first binary state value.

12. A computer-implemented method for using a machine learned model for inference using limited memory resources, comprising the following steps:
   accessing input data for the machine learned model, wherein the input data includes a temporal sequence of input data instances;
   applying the machine learned model in a series of inference steps on respective input data instances, wherein, in a respective inference step of the inference steps, the machine learned model assumes an internal state which includes or is representable as a set of binary state values representing respective elements of the respective internal state, wherein the respective internal state depends on one or more previous internal states of the machine learned model;
   providing a state memory which includes, for each element of the respective elements of the respective internal state, a respective element value which is indicative of a most recent occurrence of the respective element holding or transitioning to a particular one of the binary state values, wherein the most recent occurrence is expressed as a number of inference steps relative to a current training step; and
   during the inference, in the current training step:
      extracting, from the state memory, previous internal state information for use in determining a current internal state of the machine learned model; and
      after determining the current internal state of the machine learned model, updating the state memory with the current internal state by, for each element of the elements of the current internal state, updating the respective element value of the respective element in the state memory;
   wherein the method includes at least one of the following two features (I)-(II):
      (I) when, during the updating, the most recent occurrence for the respective element exceeds a defined temporal time window for the most recent occurrence, the most recent occurrence for the respective element is set to a furthest end of the temporal time window; and
      (II) the extracting of the previous internal state information from the state memory includes applying to the values in the state memory a temporal attention model that generates for the machine learned model one or more generated internal states representing previous internal state information selected as being relevant in accordance with the temporal attention model, the applying of the temporal attention model including normalizing the values in the state memory to provide a temporal normalization of the most recent occurrences.

13. The computer-implemented method according to claim 12, further comprising:
   obtaining the input data as sensor data from an event-based sensor.

14. A non-transitory computer-readable medium on which is stored a computer program for training a machine learnable model using limited memory resources, the computer program, when executed by a processor system, causing the processor system to perform a method, the method comprising the following steps:
   accessing training data for the machine learnable model, wherein the training data includes a temporal sequence of input data instances;
   training the machine learnable model in a series of trainings steps on respective input data instances, wherein, in a respective training step of the training steps, the machine learnable model assumes an internal state which includes or is representable as a set of binary state values representing respective elements of the respective internal state, wherein the respective internal state depends on one or more previous internal states of the machine learnable model;
   providing a state memory which includes, for each element of the elements of the respective internal state, a respective element value which is indicative of a most recent occurrence of the respective element holding or transitioning to a particular one of the binary state values, wherein the most recent occurrence is expressed as a number of training steps relative to a current training step; and
   during the training, in the current training step:
      extracting, from the state memory, previous internal state information for use in determining a current internal state of the machine learnable model; and
      after determining the current internal state of the machine learnable model, updating the state memory with the current internal state by, for each element of the elements of the current internal state, updating the respective element value of the respective element in the state memory;

wherein the non-transitory computer-readable medium includes at least one of the following three features (I)-(III):

(I) when, during the updating, the most recent occurrence for the respective element exceeds a defined temporal time window for the most recent occurrence, the most recent occurrence for the respective element is set by the method to a furthest end of the temporal time window;

(II) the method further comprises, during the training of the machine learnable model and based on statistical information derived from the training data that is indicative of a temporal distribution of occurrences of holding or transitioning to the particular one of the binary state values, selecting a number size with which to numerically represent the element value in the state memory, the number size determining the temporal time window; and (III) the extracting of the previous internal state information from the state memory includes applying to the values in the state memory a temporal attention model that generates for the machine learnable model one or more generated internal states representing previous internal state information selected as being relevant in accordance with the temporal attention model, the applying of the temporal attention model including normalizing the values in the state memory to provide a temporal normalization of the most recent occurrences.

15. A system for training a machine learnable model using limited memory resources, comprising:
an input interface configured to access training data for the machine learnable model, wherein the training data includes a temporal sequence of input data instances;
a system memory; and
a processor subsystem configured to:
train the machine learnable model in a series of trainings steps on respective input data instances, wherein, in a respective training step of the training steps, the machine learnable model assumes an internal state which includes or is representable as a set of binary state values representing respective elements of the respective internal state, wherein the respective internal state depends on one or more previous internal states of the machine learnable model;
provide, in the system memory, a state memory which includes, for each element of the elements of the respective internal state, a respective element value which is indicative of a most recent occurrence of the respective element holding or transitioning to a particular one of the binary state values, wherein the most recent occurrence is expressed as a number of training steps relative to a current training step; and
during the training, in the current training step:
extract, from the state memory, previous internal state information for use in determining a current internal state of the machine learnable model; and
after determining the current internal state of the machine learnable model, update the state memory with the current internal state by, for each element of the elements of the current internal state, updating the respective element value of the respective element in the state memory;

wherein the system includes at least one of the following three features (I)-(III):

(I) when, during the updating, the most recent occurrence for the respective element exceeds a defined temporal time window for the most recent occurrence, the most recent occurrence for the respective element is set to a furthest end of the temporal time window;

(II) the processor subsystem is further configured to, during the training of the machine learnable model and based on statistical information derived from the training data that is indicative of a temporal distribution of occurrences of holding or transitioning to the particular one of the binary state values, select a number size with which to numerically represent the element value in the state memory, the number size determining the temporal time window; and the extraction of the previous internal state information from the state memory includes applying to the values in the state memory a temporal attention model that generates for the machine learnable model one or more generated internal states representing previous internal state information selected as being relevant in accordance with the temporal attention model, the applying of the temporal attention model including normalizing the values in the state memory to provide a temporal normalization of the most recent occurrences.

16. A system for using a machine learned model for inference using limited memory resources, comprising:
an input interface for accessing input data for the machine learned model, wherein the input data includes a temporal sequence of input data instances;
a system memory; and
a processor subsystem configured to:
apply the machine learned model in a series of inference steps on respective input data instances, wherein, in a respective inference step of the inference steps, the machine learned model assumes an internal state which includes or is representable as a set of binary state values representing respective elements of the respective internal state, wherein the respective internal state depends on one or more previous internal states of the machine learned model;
provide, in the system memory, a state memory which includes, for each element of the respective elements of the respective internal state, a respective element value which is indicative of a most recent occurrence of the respective element holding or transitioning to a particular one of the binary state values, wherein the most recent occurrence is expressed as a number of inference steps relative to the current inference step; and
during the inference, in the current inference step:
extract, from the state memory, previous internal state information for use in determining a current internal state of the machine learned model; and
after determining the current internal state of the machine learned model, update the state memory with the current internal state by, for each element of the elements of the current internal state, updating the respective element value of the respective element in the state memory;

wherein the system includes at least one of the following two features (I)-(II):

(I) when, during the updating, the most recent occurrence for the respective element exceeds a defined temporal time window for the most recent occurrence, the most recent occurrence for the respective element is set to a furthest end of the temporal time window; and (II) the extraction of the previous internal state information from the state memory includes applying to the values in the state memory a temporal attention model that generates for the machine learned model one or more generated internal states representing previous internal state information selected as being relevant in accordance with the temporal attention model, the applying of the temporal attention model including normalizing the values in the state memory to provide a temporal normalization of the most recent occurrences.

17. The computer-implemented method according to claim 1, wherein, when, during the updating, the most recent occurrence for the respective element exceeds the temporal time window, the most recent occurrence for the respective element is set to the furthest end of the temporal time window.

* * * * *